United States Patent
Lindquist

(10) Patent No.: US 6,326,044 B1
(45) Date of Patent: Dec. 4, 2001

(54) FILTER APPARATUS AND METHOD FOR THE PRODUCTION OF STERILE SKIMMED MILK

(75) Inventor: Anders Lindquist, Helsingborg (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/446,270

(22) PCT Filed: Jun. 15, 1998

(86) PCT No.: PCT/SE98/01145

§ 371 Date: Mar. 29, 2000

§ 102(e) Date: Mar. 29, 2000

(87) PCT Pub. No.: WO98/57549

PCT Pub. Date: Dec. 23, 1998

Related U.S. Application Data

(63) Continuation-in-part of application No. 09/380,833, filed on Dec. 2, 1999, now abandoned.

(30) Foreign Application Priority Data

Jun. 19, 1997 (SE) .................................................. 9702359

(51) Int. Cl.$^7$ ................................ A23C 3/02; A23C 7/04
(52) U.S. Cl. ....................... 426/491; 426/330.2; 426/522; 426/580; 210/650; 210/651
(58) Field of Search ................................... 426/580, 491, 426/330.2, 522; 210/650, 651

(56) References Cited

U.S. PATENT DOCUMENTS

| | | |
|---|---|---|
| 3,233,964 | 2/1966 | Skoldberg . |
| 3,973,048 | 8/1976 | Sollerud . |
| 3,983,257 | 9/1976 | Malmberg et al. . |
| 4,175,141 | 11/1979 | Adams, Jr. et al. . |
| 4,340,479 | 7/1982 | Pall . |

(List continued on next page.)

FOREIGN PATENT DOCUMENTS

| | | |
|---|---|---|
| 2209919A | 5/1989 | (GB) . |
| 86/01687 | 3/1986 | (WO) . |
| 87/05469 | 9/1987 | (WO) . |
| 94/26121 | 11/1994 | (WO) . |
| 96/08155 | 3/1996 | (WO) . |
| 96/36238 | 11/1996 | (WO) . |
| 97/49295 | 12/1997 | (WO) . |
| 98/02047 | 1/1998 | (WO) . |
| 98/41102 | 9/1998 | (WO) . |

OTHER PUBLICATIONS

"8. Alternative Methods: Legal and Control Aspects" H. Glaeser, European Commission, Heat Treatments & Alternative Methods, Proceedings of the IDF Symposium held in Vienna (Austria) Sep. 6–8, 1995, pp. 438–447.

"Filter Out Bacteria", Dairy Foods® Mar. 1996, p. 55.

"Psychotrophs in Dairy Products: Their Effects and Their Control" Claude P. Champagne et al., Critical Reviews in Food Science and Nutrition, vol. 34, Issue 1, 1994, pp. 1–30.

"Dairy Technology", Food Science and Technology, Research Report 1988–89, pp. 96–105.

*Primary Examiner*—Helen Pratt
(74) *Attorney, Agent, or Firm*—Burns, Doane, Swecker & Mathis, L.L.P.

(57) ABSTRACT

The present invention relates to a method for the production of commercially sterile skimmed milk. After separation, the skimmed milk fraction is treated by microfiltration in one or more steps. The microfiltration gives a permeate flow and a retentate flow, in which all microorganisms of a given size have effectively been separated from the permeate flow. After the microfiltration, the permeate flow is heat treated at a temperature of 72–134°C. during a requisite period of time. In order to obtain a sterile skimmed milk which is as good as free of destroyed microorganisms, the retentate flow is not employed.

16 Claims, 1 Drawing Sheet

U.S. PATENT DOCUMENTS

Figure 1:
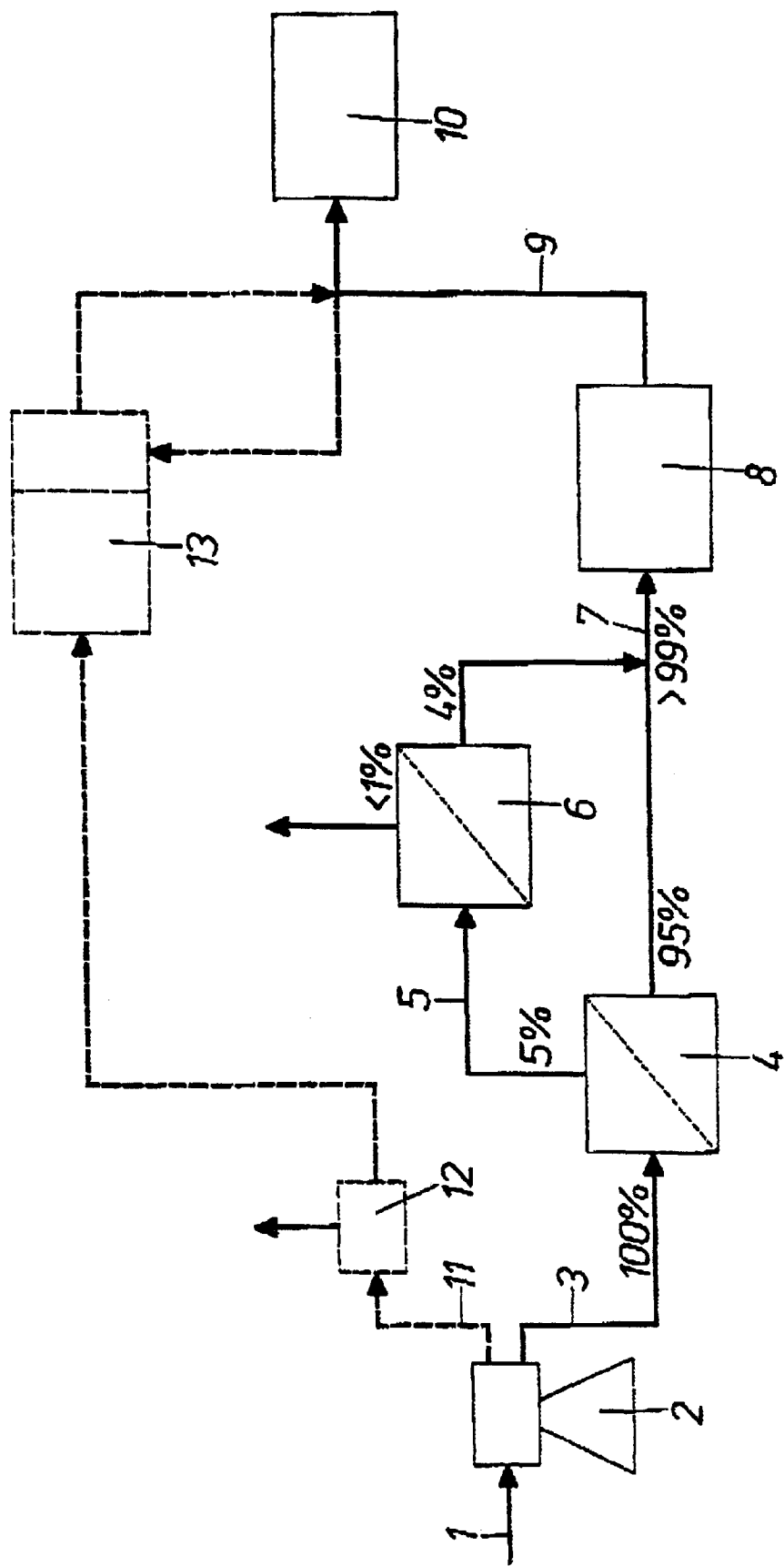

| | | |
|---|---|---|
| 4,515,823 | 5/1985 | Kirshenmann . |
| 4,853,246 | 8/1989 | Stevens . |
| 4,876,100 | 10/1989 | Holm et al. . |
| 4,931,302 | 6/1990 | Leshik et al. . |
| 5,028,436 * | 7/1991 | Gauri .................................. 426/491 |
| 5,137,738 | 8/1992 | Wynn . |
| 5,256,437 | 10/1993 | Degen et al. . |
| 5,338,553 | 8/1994 | Johnson et al. . |
| 5,356,651 * | 10/1994 | Degen et al. ........................ 426/491 |
| 5,401,523 | 3/1995 | Degen et al. . |
| 5,576,040 | 11/1996 | Moller et al. . |
| 5,679,780 | 10/1997 | Jensen et al. . |
| 5,683,733 * | 11/1997 | Krabsen et al. .................... 426/491 |
| 5,935,632 | 8/1999 | Larsen . |
| 6,051,268 * | 4/2000 | Mahmoud et al. .................. 426/580 |

\* cited by examiner

US 6,326,044 B1

FILTER APPARATUS AND METHOD FOR THE PRODUCTION OF STERILE SKIMMED MILK

CROSS REFERENCE TO RELATED APPLICATION

This application is a continuation-in-part of U.S. patent application Ser. No. 09/380,833, filed Dec. 2, 1999, now abandoned.

TECHNICAL FIELD

The present invention relates to a method for the production of sterile skimmed milk.

BACKGROUND ART

Sterile milk, or commercially sterile milk may be defined as a product which is free of microorganisms which can grow under the prevailing conditions. A sterile milk, packed under aseptic conditions in aseptic packages, enjoys the advantage of being able to be distributed and stored at room temperature for a lengthy period of time.

In order to produce such a commercially sterile milk, the commonest method hitherto has been UHT treatment (Ultra High Temperature), i.e. treatment of the milk at elevated temperature, normally between 135° and 150°C. for between 4 and 15 seconds. As a result of the heat treatment, microorganisms are destroyed so that the resultant product is a milk of long shelf-life at room temperature. However, the drawback inherent in milk treated by the UHT method is that the high temperature imparts to the milk ac cooked flavour.

With a view to reducing the contents of harmful microorganisms, use has recently been made of microfiltration, a method which is described in Swedish Patent Specification SE 451 791. In the described method, use is made of a microfilter, normally of ceramics, through which the skimmed milk fraction, after separation, is caused to pass. In the microfilter, the skimmed milk is divided into a permeate flow which has a considerably reduced content of microorganisms, and a retentate flow, which contains the majority of bacteria and spores. The retentate is treated at elevated temperature and thereafter returned to the permeate. This method gives a product which has a longer shelf-life than normal, pasteurised milk, but it must be kept under cold storage and cannot be considered as sterile.

In Swedish patent application 9602546-5, use is made of microfiltration to produce an aseptic consumer milk. By employing a microfilter of slight pore size, milk with a higher fat content can be filtered. The permeate flow, which contains the major fraction of the thermosensitive whey proteins, is free of microorganisms. The retentate flow, which contains fat, casein and microorganisms, undergoes a high temperature treatment, whereafter both of the flows are mixed. Employing this method, there will be obtained a commercially sterile product which, however, contains the destroyed microorganisms.

The present invention relates to a method of obtaining, primarily, a commercially sterile skimmed milk for consumption, but by the admixture of the cream fraction in suitable proportions, it is possible, employing this method, to obtain a consumer milk with varying fat content. The present invention also entails a method which gives a sterile product which is as good as free of destroyed microorganisms and which thereby may be considered as purer than milk produced according to prior art methods.

OBJECTS OF THE INVENTION

One object of the present invention is to obtain a commercially sterile skimmed milk intended for consumption, which is of extreme purity in that the majority of the destroyed microorganisms are not contained in the finished product.

A further object of the present invention is to realise a sterile milk product with improved flavour properties, since the method involves heat treatment at relatively low temperatures.

SOLUTION

These and other objects have been attained according to the present invention in that the method of the type disclosed by way of introduction has been given the characterizing features that the skimmed milk is treated by microfiltration for obtaining a retentate flow and a permeate flow, and that the permeate flow is thereafter heat treated at a temperature of between 72° and 134°C.

Preferred embodiments of the present invention have further been given the characterizing features as set forth in the appended subclaims.

BRIEF DESCRIPTION OF THE ACCOMPANYING DRAWING

One preferred embodiment of the present invention will now be described in greater detail hereinbelow, with reference to the accompanying Drawing, in which:

FIG. 1 is a flow diagram illustrating a facility for reducing the method according to the present invention into practice.

DESCRIPTION OF PREFERRED EMBODIMENT

The raw milk which enters the dairy through a conduit 1 is separated at a temperature of 4–60°C. A common temperature in separation in a conventional separator 2 is 55°C. In the separator 2, the milk is divided up into a cream fraction and a skimmed milk fraction. The skimmed milk has a fat content of approx. 0.05–0.15%. The cream fraction is treated separately, as will be described in greater detail below, and the present invention relates essentially to the skimmed milk fraction.

In a conduit 3, the skimmed milk is led from the separator 2 to a first microfilter 4. The microfiltration takes place most effectively if the milk is at a temperature of approx. 50°C. The microfilter 4 may, for example, be made of ceramics. In the microfilter 4, the skimmed milk fraction is divided into a permeate flow and a retentate flow.

In a first embodiment, the microfilter 4 has an effective pore size of 0.5 μm, i.e. the filter 4 should be capable of effectively separating from the permeate flow all microorganisms which are larger than or equal to 0.5μm, including all spore normally occurring in the milk. Microorganisms are defined as all bacterial and spores normally occurring in the milk. The size of the microorganisms is defined by their least diameter, and effective separation is taken here to signify a reduction of the number of microorganisms by a factor of $\geq 1,000,000$ ($\geq$ log 6 reduction).

Trials have shown that a microfilter 4 according to this first embodiment of the invention, with an effective pore size which is $\geq 0.5\mu m$, should preferably be combined with a subsequent heat treatment at a temperature of 90–105°C. By a combination of these two method steps, there will be obtained a product, a skimmed milk, which is commercially sterile, i.e. the product is free of microorganisms which can grow under the prevailing conditions.

In a second embodiment of the present invention, use is made of a microfilter 4 with an effective pore size which is $\geq 0.3$ μm, which effectively separates the microorganisms which are ≥0.3 μm, including the major proportion of thermoresistant bacteria and all spores. In this second embodiment, the microfiltration is combined with a heat treatment at 72–98° C. and this combination of method steps realises a commercially sterile product.

Depending upon filter type, how the filter 4 is constructed or how it is designed, the microfiltration may take place in one or more steps. The number of steps may depend on the size of the total quantity of filtered product which is made up by the retentate flow. The number of steps may also depend upon whether the intention is to employ the retentate flow or not, and on that efficiency which is obtained with a filter 4.

In those trials which have been carried out with a microfilter 4 displaying an effective pore size of 0.5 μm, the permeate flow constitutes 95% of the skimmed milk fraction. The retentate flow, which consequently constitutes 5% of the skimmed milk fraction, contains all separated microorganisms which are ≥0.5 μm.

With a view to obtaining a greater yield from the method according to the present invention, the retentate flow is led, in the preferred embodiment, from the first microfilter 4 into a conduit 5 to a second microfilter 6. The second microfilter 6 may, for example, be made of ceramics and it should have at least the same effective pore size as the first filter 4. In the second filter 6, the incoming portion (5%) of the skimmed milk fraction is divided into a new permeate and retentate flow. The permeate flow from the second filter 6 consists, in the example, of 4% of the incoming skimmed milk fraction.

The retentate flow from the second filter 6, which constitutes less than 1% of the total skimmed milk fraction, thus contains all of the microorganisms separated from both of the filters 4, 6 which are ≥0.5 μm. The retentate flow from the second filter 6 is led off and, in the preferred embodiment of the present invention, not employed in the production of a sterile skimmed milk according to the invention.

The method may also include additional filters 4, 6 which cooperate correspondingly, so that the retentate from the second filter 6 is led to a third filter, and so on. But since the retentate flow already from the second filter 6 constitutes less than 1% of the total skimmed milk fraction, additional filters 4, 6 will not increase the yield from the method to any appreciable degree.

The permeate flows from the two microfilters 4, 6 are combined in a conduit 7 and led to some form of heat treatment equipment 8 which may consist of a conventional plate heat exchanger. The two combined permeate flows thus contain no microorganisms which are larger than 0.5 μm in the first embodiment and no microorganisms which are larger than 0.3 μm in the second embodiment. Microorganisms remaining in the milk require a moderate temperature in order to be neutralised. The two permeate flows are heat treated in the heat treatment equipment 8 at 72–134° C., preferably at 90–105° C. in the first embodiment and at 72–98° C. in the second embodiment for a requisite period of time.

The heat treated product which consists of more than 99% of the skimmed milk fraction is now commercially sterile and is led in the conduit 9 further to packing in an aseptic filling machine 10, where the product is packed in aseptic packages which may be distributed and stored at room temperature. The finished product is also extremely pure, since it contains no other destroyed microorganisms than those neutralised in the heat treatment and these constitute a infinitesimal quantity of the microorganisms which initially exist in untreated milk.

The cream fraction is treated separately and, after separation, it is led in the conduit 11 via standardisation equipment 12 to a high temperature treatment unit 13, the unit 13 normally also including a homogenizer. In fat contents >12% in the cream fraction, a part of the sterile skimmed milk may be employed in the homogenization.

By selecting, in the standardisation equipment 12, a certain proportion of cream for admixture into the skimmed milk fraction it is possible to obtain a consumer milk displaying a given, desired fat content. The standardised, sterile product is packed aseptically in accordance with the foregoing for obtaining a commercially sterile, standardised consumer milk.

As will have been apparent from the foregoing description, the present invention realises a method of producing a commercially sterile skimmed milk intended as consumer milk, the skimmed milk being extremely pure since it does not contain the quantity of destroyed microorganisms which sterile milk normally contains. Given that the milk is exposed to a temperature treatment which is considerably lower than conventional UHT milk, it possesses improved flavour properties, and the flavour may be compared with the flavour of pasteurised milk.

What is claimed is:

1. Filter apparatus for skimmed milk production comprising a first microfilter and a second microfilter each having an effective pore size of about 0.5 μm or less, said filter apparatus including a supply conduit for supplying a stream of skimmed milk to the first microfilter, a first discharge conduit for the milk permeate, and a second discharge conduit for conducting the retentate from the first microfilter to the second microfilter, a third discharge conduit for conducting the permeate from the second microfilter to the first discharge conduit where the respective permeate are mixed together, and, wherein said skimmed milk has a lower concentration of microorganisms by a factor of log 6 than said milk permeate.

2. The filter apparatus of claim 1, wherein the milk permeate is free from all spores.

3. The filter apparatus of claim 1, wherein the milk permeate has a reduced number of thermoresistant bacteria compared to the skimmed milk.

4. The filter apparatus of claim 1, having an effective pore size of about 0.3 μm or less.

5. The filter apparatus of claim 4, wherein the milk permeate has a reduced number of thermoresistant bacteria compared to the skimmed milk, and the milk permeate is free from all spores.

6. A method of filtering skimmed milk comprising:

passing skimmed milk through a first filter having an effective pore size of about 0.5 μm or less to form a first permeate flow and a first retentate flow, conducting the first retentate flow to a second filter having an effective pore size of about 0.5 μm or less to form a second permeate flow and a second retentate flow, and combining the first permeate flow with the second permeate flow, and subjecting the combined permeate flows to further processing, whereby this method reduces the number of microorganisms in the combined permeate flow to less than the number of microorganisms in said skimmed milk by a factor of at least log 6.

7. The method of claim 6, wherein the combined permeate flow is free of spores.

8. The method of claim 6, wherein the combined permeate flow has a reduced number of thermoresistant bacteria compared to the skimmed milk.

9. The method of claim 6, further including passing the retentate flow through a second filter having an effective pore size of about 0.3 μm or less.

10. A method for removing microorganisms from milk comprising:

passing skimmed milk through a first filter having a pore size of about 0.5 µm or less to form a first permeate flow and a first retentate flow, passing the retentate flow from the first filter to a second filter having a pore size of about 0.5 µm or less to form a second permeate flow and a second retentate flow, and mixing the first permeate flow with the second permeate flow, whereby reducing the number of organisms in the skimmed milk after the mixing step by a factor of at least log 6.

11. The method of claim 10, including subjecting the milk after the mixing step to heat treatment at about 72 to 134° C.

12. The method of claim 11, wherein the first and second filters have an effective pore size of about 0.3 µm and the heat treatment is carried out at about 72 to 98° C.

13. The method of claim 10, including passing milk through a separator to provide a supply of skimmed milk and cream, and causing the skimmed milk to pass to the first filter.

14. Filter apparatus for skimmed milk production comprising:

a first filter having a pore size of about 0.5 µm or less, a second filter having a pore size of about 0.5 µm or less, a first conduit for conducting retentate from the first filter to the second filter, a second conduit for conducting premeate from the first filter to a predetermined location, and a third conduit for conducting the premeate from the second filter to the predetermined location, whereby the microorganisms having a size that is equal to or greater than 0.5 µm are separated from the skimmed milk to provide a product in which the microorganisms are reduced by a factor of at least log 6.

15. The filter apparatus of claim 14, including a heat treatment chamber and a third conduit for conducting the skimmed milk from the predetermined location though the heat treatment chamber.

16. The filter apparatus of claim 14, including a separator for separating raw milk into a skimmed milk stream and a cream stream, and a third conduit for conducting the skimmed milk stream to the first filter.

* * * * *